June 3, 1941. L. ZAIGER 2,244,353
BUMPER FOR AUTOMOBILES
Filed July 29, 1939 2 Sheets-Sheet 1
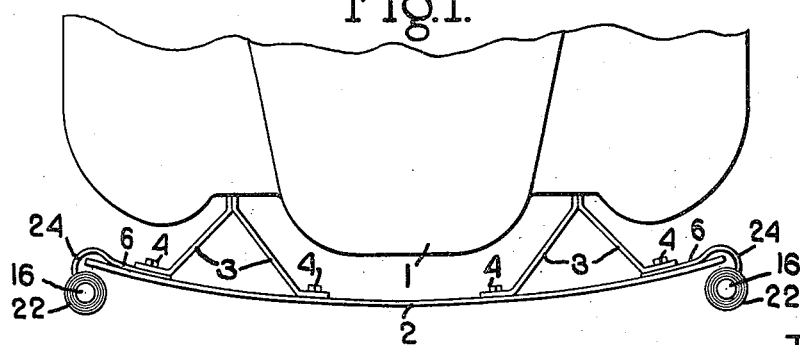
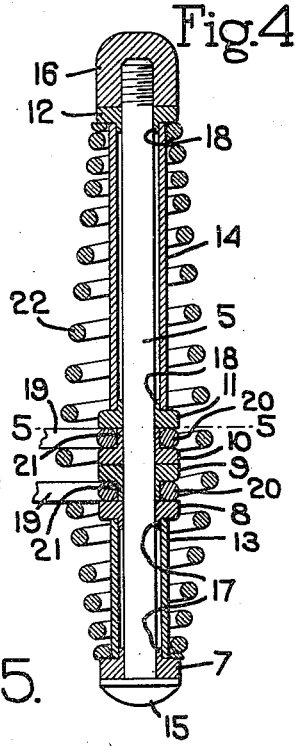
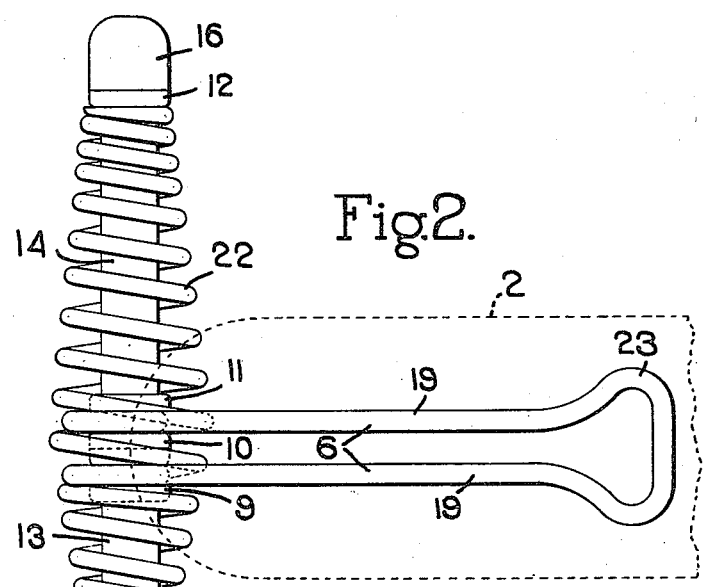
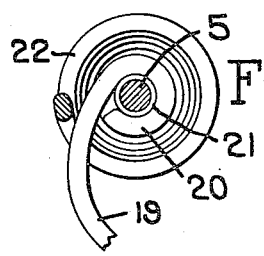
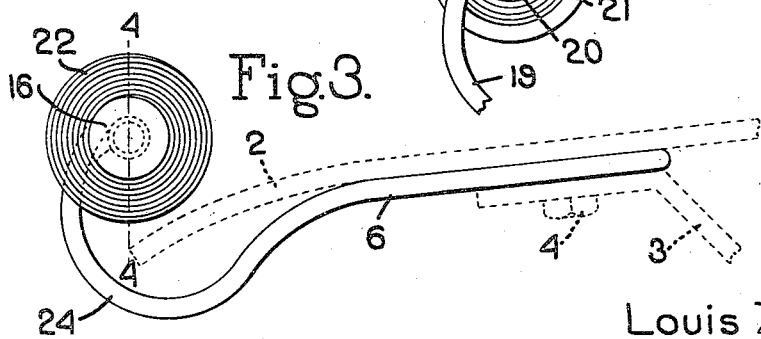
Inventor.
Louis Zaiger
by Heard Smith & Tennant
Attys.

June 3, 1941. L. ZAIGER 2,244,353
BUMPER FOR AUTOMOBILES
Filed July 29, 1939 2 Sheets-Sheet 2
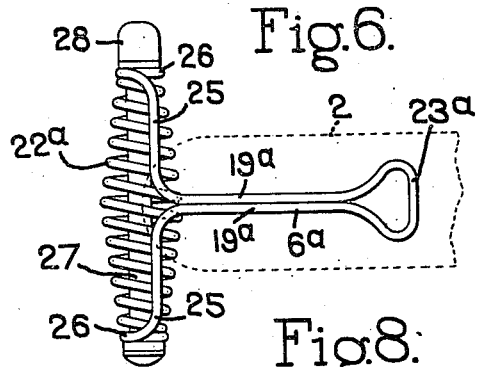
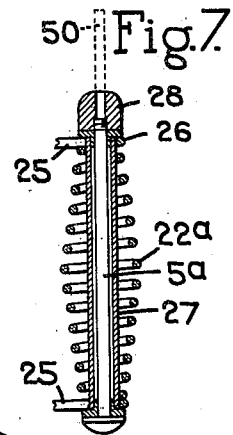
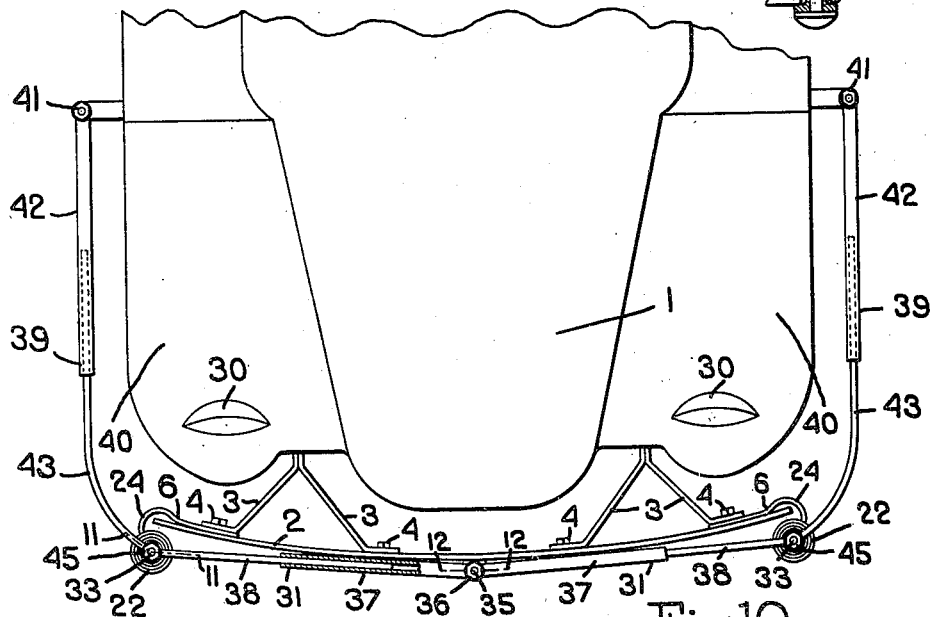
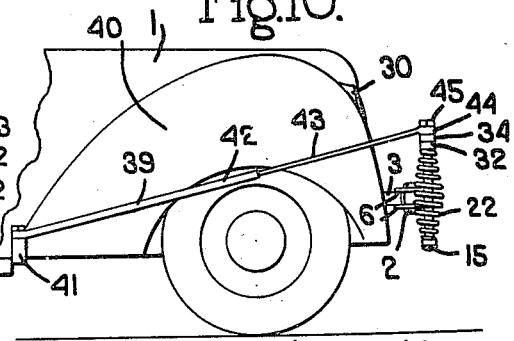
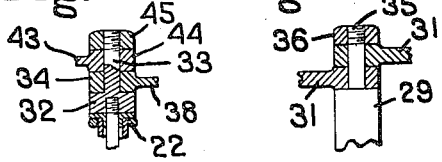
Inventor.
Louis Zaiger
by Heard Smith & Tennant
Attys.

Patented June 3, 1941

2,244,353

UNITED STATES PATENT OFFICE 2,244,353

BUMPER FOR AUTOMOBILES

Louis Zaiger, Lynn, Mass.

Application July 29, 1939, Serial No. 287,228

4 Claims. (Cl. 293—55)

This invention relates to bumpers for automobiles and particularly to an attachment for a bumper which is in the nature of a bumper extension that can be readily attached to a standard bumper such as constitutes the regular equipment for automobiles, said extension, when thus attached to the bumper, providing an extended contact face for the bumper and also providing contact members at the end of the bumper which are capable of turning about a vertical axis so that in case the bumper of the automobile comes in contact with any object, it will have a rolling contact therewith. This is especially advantageous when in parking or driving a car the end of the bumper comes in contact with the fender or some other part of another car. The rolling contact provided by my invention eliminates to a great extent the possibility that the object with which the bumper comes in contact will be marred or damaged by the contact.

In order to give an understanding of my invention I have illustrated in the drawings some selected embodiments thereof which will now be described, after which the novel features will be pointed out in the appended claims.

In the drawings:

Fig. 1 is a plan view of the front end of an automobile having a bumper equipped with my improvement.

Fig. 2 is a side view of my improved bumper extension, the bumper to which it is attached being shown in dotted lines.

Fig. 3 is a top plan view of Fig. 2.

Fig. 4 is a section on the line 4—4, Fig. 3.

Fig. 5 is a section on the line 5—5, Fig. 4.

Fig. 6 is a view similar to Fig. 2 but showing a different embodiment of the invention.

Fig. 7 is a section on the line 7—7, Fig. 6.

Fig. 8 is a view similar to Fig. 1 showing an embodiment of the invention which is provided with guards for the headlights and for the front fenders.

Fig. 9 is a view on a reduced scale showing the bumper construction illustrated in Fig. 8.

Fig. 10 is a side view on a reduced scale of the construction shown in Fig. 8.

Fig. 11 is an enlarged sectional view showing the manner of securing the guard members 31 and 39 to the bumper extension.

Fig. 12 is a sectional view showing the manner of securing the guard members 31 to the bumper guard.

In the drawings, 1 indicates the front portion of an automobile which is equipped with the usual bumper 2, the latter presenting the horizontal bumper bar which is secured to the vehicle by means of supporting brackets 3. These brackets are usually bolted to the bumper bar by means of bolts 4.

My present improvements relate to an attachment adapted to be secured to the end of the bumper bar and which is constructed not only to give increased bumper protection, but is also constructed so as to present contact members at each end of the bumper which extend above and below the latter and which are mounted for turning movement so that if the contact members engage any object, they will have a rolling contact therewith, thus reducing the liability that such object will be marred by the contact.

My improved bumper extension (there being one such extension at each end of the bumper 2) comprises a supporting member, a resilient stem by which the supporting member is secured to the end of the bumper 2, and contact members carried by the supporting member and extending above and below the bumper 2, which contact members are mounted to have a rotating or turning movement on the supporting member.

In the construction shown in Figs. 1 to 4, the supporting member comprises a bolt 5 having mounted thereon a series of collars 7, 8, 9, 10, 11 and 12 which are held in spaced relation by two spacing sleeves 13 and 14. The collar 7 rests against the head 15 of the bolt and is held spaced from the collar 8 by the spacing sleeve 13. The collar 12 engages the nut 16 which is screw-threaded to the upper end of the bolt and said collar is spaced from the collar 11 by the spacing sleeve 14. The collars 9 and 10 have an abutting relation and are confined between the collars 8 and 11, said collars and spacing sleeves being held clamped together by the nut 16.

The collars 7 and 8 are formed with flanges 17 which enter the ends of the spacing sleeve 13, and similarly, the collars 11 and 12 are formed with flanges 18 which enter the ends of the spacing sleeve 14.

The resilient stem by which the supporting member is secured to the bumper is indicated at 6 and it is preferably made from spring wire bent to form the two arms 19, the free ends of the arms 19 being bent into loops 20 which encircle the collars 9 and 10. Each of these collars is shown as having a portion 21 of reduced diameter which is encircled by a loop 20, said loops being confined between the collars 8 and 11 and the larger portions of the collars 9 and 10.

Each supporting member has mounted thereon a contact element which extends above and below the bumper and is mounted for turning movement on the supporting member. In the illustrated embodiment of the invention, such contact element is in the form of a coil 22 of spring wire which encircles the supporting member and is confined between the collars 7 and 12. This coil 22 is shown as having a larger diameter at its central portion than at its ends, each coil having a progressively decreasing diameter from the central portion toward each end. Since the coil 22 is loosely mounted on the supporting member and is confined between the collars 7 and 12, said coil can have a rotative movement about the supporting member. The various turns of coil 22 may be considered as contact members since they constitute the portions of the contact element with which an object will contact.

The arms 19 of the stem 16 extend between the turns of the coil 22 and, therefore, do not interfere with the rotative movement of the coil.

A convenient way to attach the extension to the bumper is to remove the bolt 4 for each outside bumper bracket 3 and then to insert the stem 6 between the rear face of the bumper and the bracket. The replacement and tightening of the bolt 4 will firmly clamp the stem 6 to the bumper. In making the stem 6, it may be provided with the loop portion 23 through which the bolt 4 may pass.

I will preferably give the outer end of the stem 6 a sort of goose neck shape as indicated at 24, the curved portion 24 extending around the end of the bumper 2 so that the contact element 22 will be located in front of the bumper, as best seen in Figs. 1 and 3. The contact surface thus adds to the over-all length of the bumper, and thus gives added protection to the fenders of a car equipped with my improvements. Furthermore, since the contact element 22 is resilient and is also capable of rotating on its supporting member, said contact element will have a rolling contact with any object with which it accidently comes in contact. This rolling contact will assist materially in clearing the automobile from such object, and will also reduce materially the likelihood that such object will become marred or scratched by the contact of the bumper therewith.

In the construction shown in Figs. 1 to 5, the stem 6 is secured to the supporting member midway of its length. In Figs. 6 and 7 I have shown a construction wherein the stem by which the bumper extension is secured to the bumper is attached to the supporting member at the ends. In this embodiment of my invention, the stem is indicated at 6a and it is made of wire which is bent centrally to form the loop 23a, and the two arms 19a. The outer end of each arm is bent laterally, as shown at 25, and the extremity of each arm is bent into a loop 26 which encircles the supporting member, the latter being in the form of a bolt 5a having a sleeve 27 mounted thereon. In this embodiment the two loops 26 of the stem are at the opposite ends of the supporting member. The resilient contact element is indicated at 22a and it comprises a coil of wire similar to the contact element 22. This coil of wire has an enlarged diameter at its central portion, and it is confined between the loops 26 of the stem. The bolt 5a has at its end a nut 28 which retains the sleeve 27 and the contact element thereon.

In this embodiment the contact element 22a is resilient because it is formed from a coil of spring wire, and is also free to rotate on the supporting member whenever it is brought into impinging contact with an object.

In Figs. 8 to 10, I have illustrated an embodiment of the invention which not only has the bumper extension but which also has guards for the headlights and for the front fenders. In said figures, the bumper 2 is shown as having a bumper guard 29 secured to it midway of its length and extending upwardly from the bumper. To provide protection for automobile headlights 30 when they are sunk in the fenders of the automobile, as the headlights are in many makes of automobiles, I propose to employ a guard member 31 which extends from the end of each bumper extension to the bumper guard 29. In this construction, the nut 32 at the upper end of the supporting member has a stem 33 which extends upwardly therefrom, and the guard member 31 is provided at its outer end with an eye 34 through which the stem 33 extends. The bumper guard 29 is also provided at its end with a portion 35 of reduced diameter which extends through an aperture in the end of the guard member 31. The two guard members 31 are retained on the portion 35 of the bumper guard by means of a clamping nut 36. The guard members 31 are preferably made telescopic, each guard member comprising two sections 37 and 38 having a telescopic relation. These guard members 31 are located slightly below but in front of the headlights 30 of the automobile, and thus furnish a suitable guard for such headlights.

I have also shown an additional fender guard 39 which extends from each bumper extension along the outside of the front fender 40, the rear end of which fender guard is secured to the automobile body in some appropriate way, as indicated at 41. The fender guard 39 is shown as comprising two sections 42, 43, having a telescopic relation, the section 43 having an eye 44 at its end which fits over the stem 33. This stem 33 has the nut 45 thereon which clamps the two guards 31 and 39 to the bumper extension. When the bumper extension engages any object, it will yield slightly due to the resilient material of its stem, and the telescopic construction of the guard members 31 and 39 permit this yielding movement of the bumper.

Although I have shown the fender guard 39 as secured to the upper end of the bumper extension, it will be obvious that if desired, the fender guard might be secured to the lower end of the bumper extension in which case it would more effectively guard the hub caps of the front wheel.

I claim:

1. The combination with an automobile bumper complete in itself and constituting standard equipment for automobiles, of a bumper extension comprising a vertical supporting member, a resilient stem by which the supporting member is secured to the bumper at the end thereof, and a contact element in the form of a wire coil carried by and encircling the supporting member, said contact element having a progressively decreasing diameter from its central portion toward each end and being capable of having a turning movement about the supporting member.

2. The combination with a bumper of an automobile, of a bumper extension comprising a vertical supporting member, a contact element carried by the supporting member and capable of turning thereabout, a stem extending from the supporting member and having a goose neck portion, and means to secure the stem to the bumper with the goose neck portion extending around the end of the bumper.

3. The combination with an automobile bumper complete in itself and of standard length and such as constitutes standard equipment for an automobile, of a bumper extension separate from the complete bumper and comprising a vertical supporting member having a greater vertical dimension than the bumper, a resilient stem by which the supporting member is detachably secured to the bumper at the end thereof and in a position to extend both above and below the bumper, and a contact element carried by the supporting member and also extending above and below the bumper, said contact element being capable of having a turning movement about the supporting member.

4. The combination with an automobile bumper complete in itself and of standard length and such as constitutes standard bumper equipment for an automobile, of a bumper extension separate from the complete bumper and comprising a vertical supporting member having a greater vertical dimension than the bumper, a resilient stem by which the supporting member is detachably secured to the bumper at the end thereof and in a position to extend well above the bumper, and a contact element carried by the supporting member and having a greater vertical dimension than the bumper and also extending well above the bumper, said contact element being capable of having a turning movement about its supporting member.

LOUIS ZAIGER.